Sept. 14, 1937.  E. H. EASTMAN  2,092,911
AUTOMATIC CLUTCH
Filed Sept. 15, 1932  6 Sheets-Sheet 4
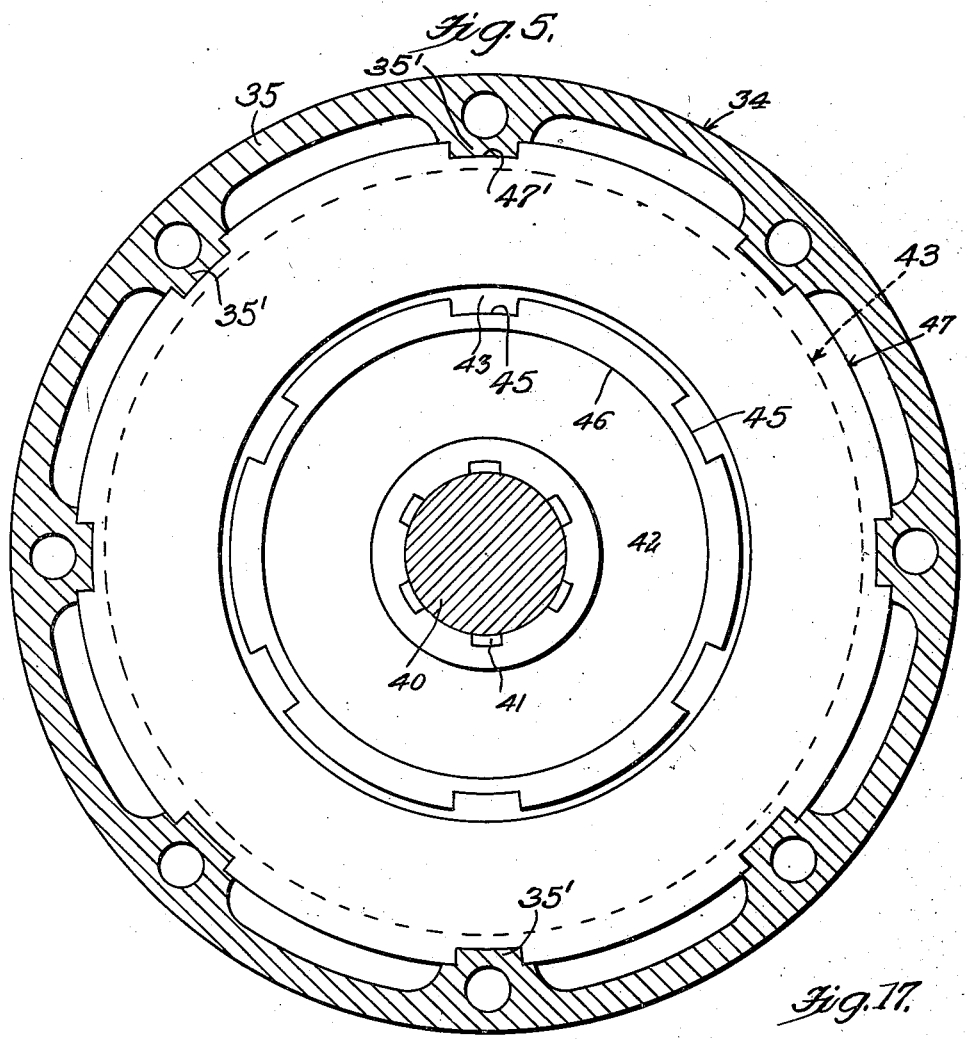
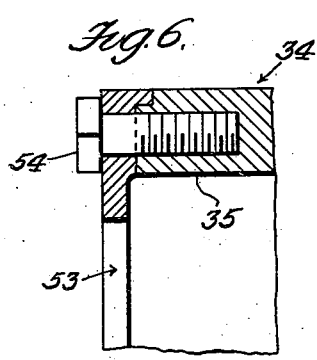
Inventor
E. H. Eastman,
By Clarence A. O'Brien
Attorney Sept. 14, 1937.　　　　E. H. EASTMAN　　　　2,092,911
AUTOMATIC CLUTCH
Filed Sept. 15, 1932　　　6 Sheets-Sheet 5
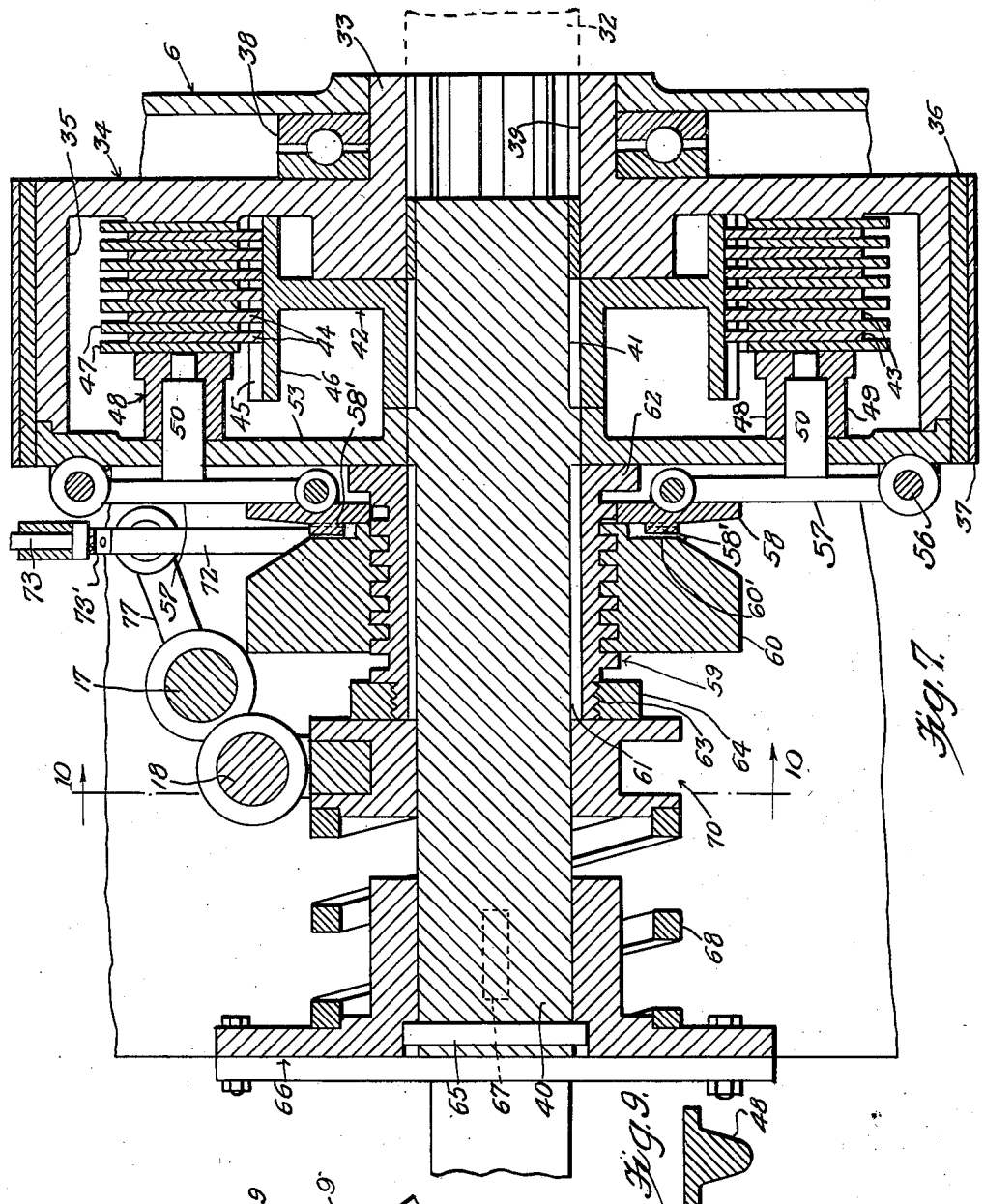
Inventor
*E. H. Eastman,*
By *Clarence A. O'Brien,*
Attorney

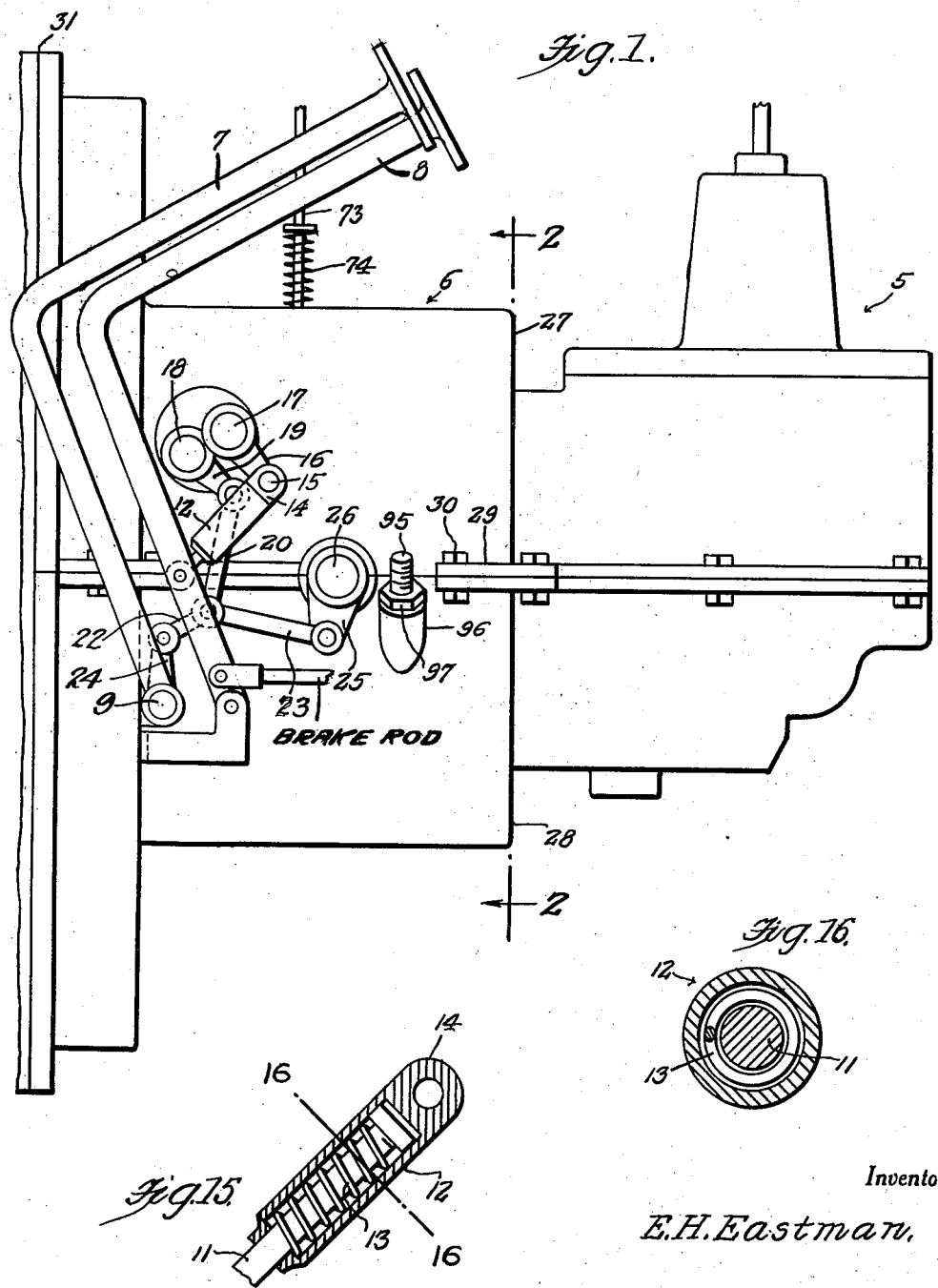

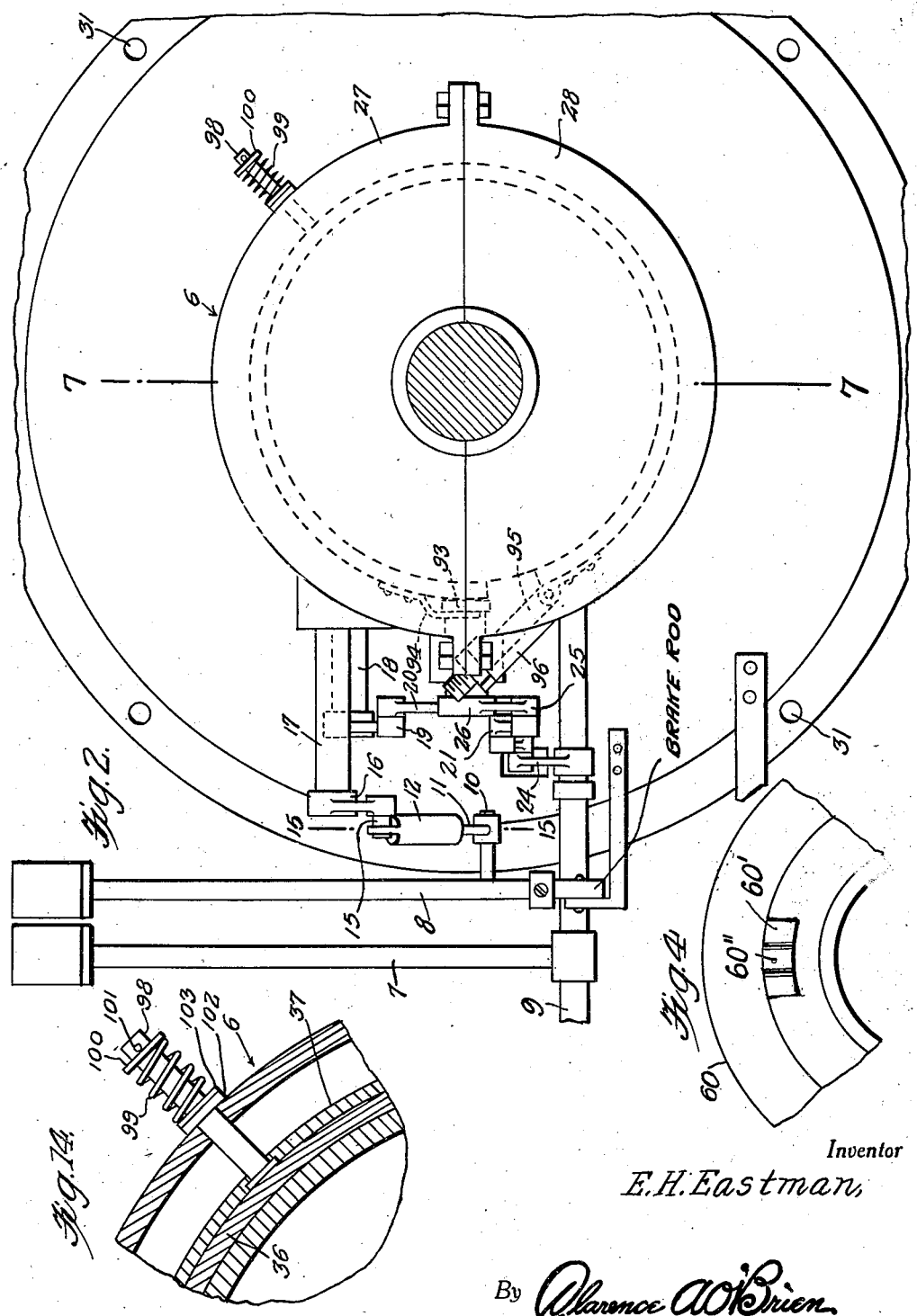

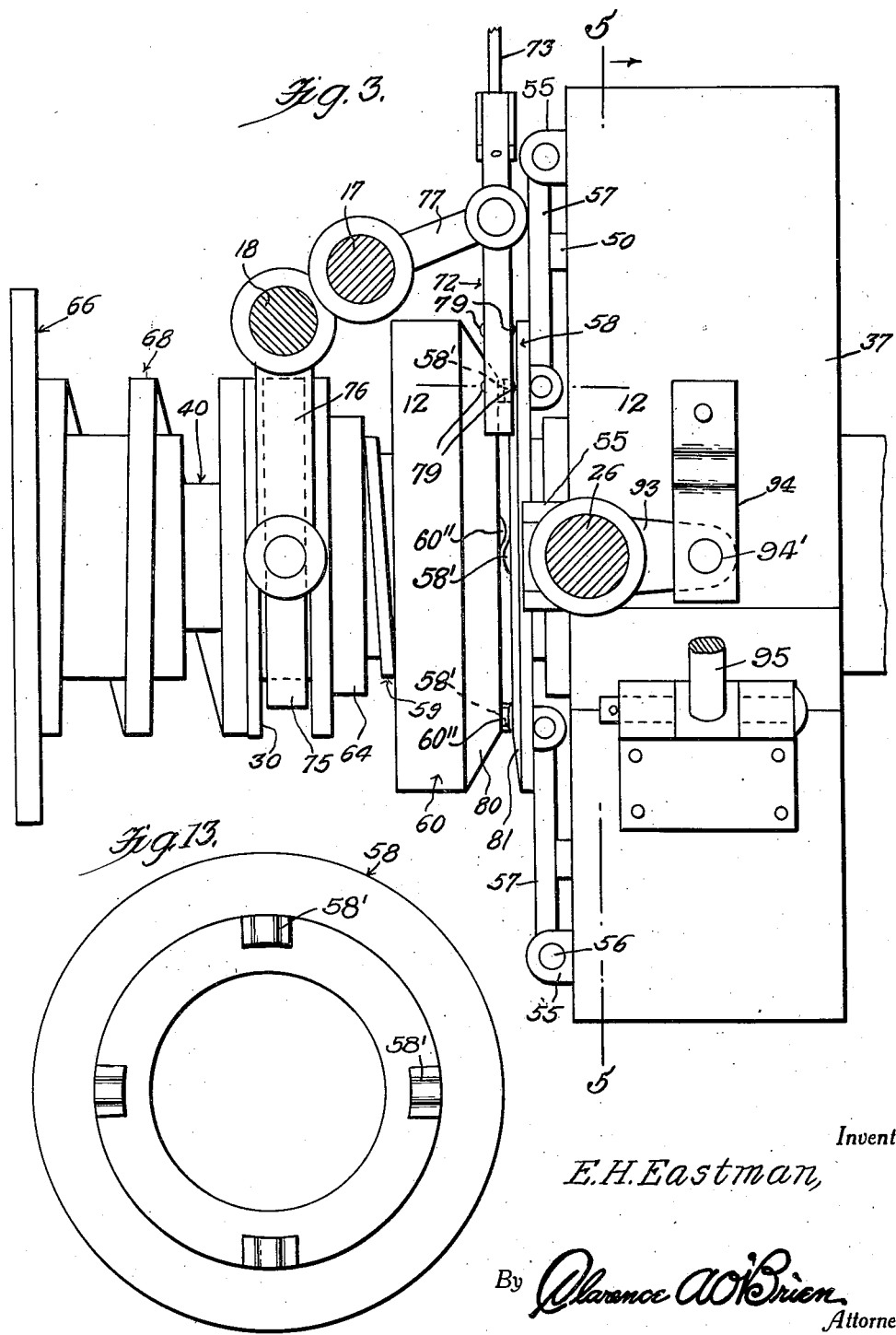

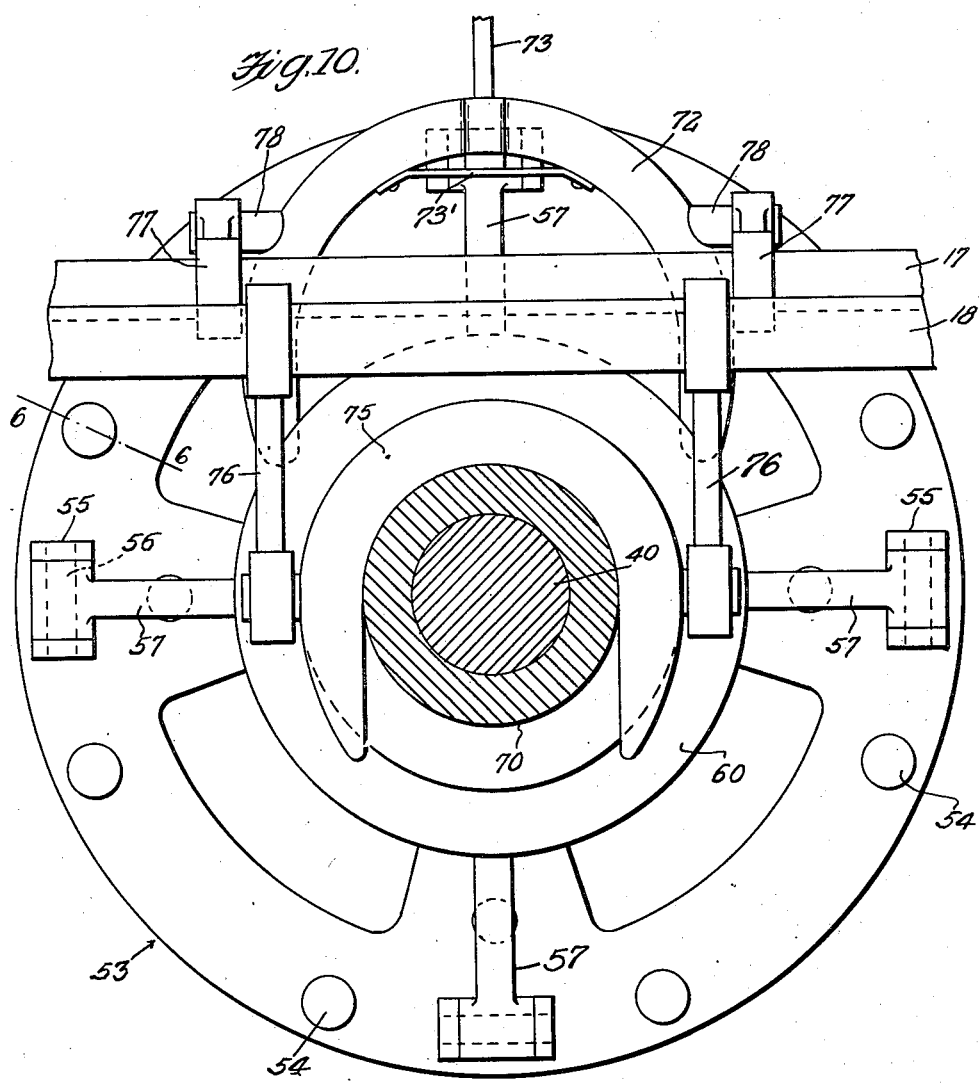
Sept. 14, 1937.  E. H. EASTMAN  2,092,911
AUTOMATIC CLUTCH
Filed Sept. 15, 1932  6 Sheets—Sheet 6
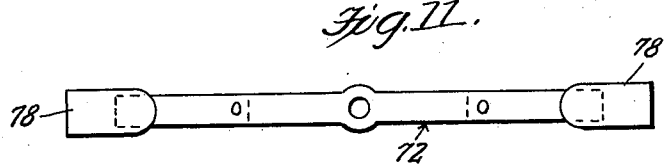
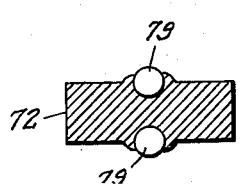
Inventor
E. H. Eastman,
By Clarence A. O'Brien
Attorney Patented Sept. 14, 1937

2,092,911

UNITED STATES PATENT OFFICE 2,092,911

AUTOMATIC CLUTCH

Ernest H. Eastman, Miami, Fla.

Application September 15, 1932, Serial No. 633,340

8 Claims. (Cl. 192—13)

My invention relates to means for connecting the power plant of a motor vehicle or the like to the driving wheels or the like thereof, and relates particularly to controllable automatic clutch means for connection between the motor of a motor vehicle and the change-speed mechanism thereof, and an important object of my invention is to provide controllable automatic clutch means of this type which is "free-wheeling", but which can be quickly locked against free-wheeling so that the braking action of the motor may be utilized, said clutch mechanism including means for locking the releasing means of the clutch as the vehicle brakes are applied, together with means permitting the changing of gears in the transmission or change-speed device without the necessity to use the clutch pedal after the first manual disengagement and engagement of the clutch pedal, and to provide that this clutch mechanism be adaptable to different types and classes of motor vehicles, and be susceptible of easy and efficient installation thereon.

Another important object of my invention is to provide automatic clutch mechanism of the type described in which all of the working parts run in oil, including a large number of clutch disks, which because of their number prevent grabbing and eliminate transmission of vibration from the motor.

Another important object of my invention is the provision in a clutch mechanism of this type of clutch brake means which acts similar to a drive shaft brake, and promotes ease of quick stopping and starting and thereby increases safety and convenience in the operation of the vehicle, and to provide speed affected clutch disk engaging and releasing means whose action is strong and positive, the action thereof increasing with the load, so as to positively prevent slipping of the clutch plates while fully engaged.

Other objects and advantages of my invention will be apparent from a reading of the following description in connection with the drawings, wherein for purposes of illustration I have shown a preferred embodiment of the invention.

In the drawings:—

Figure 1 is a general side elevational view of the left side of the embodiment of the invention installed between a conventional transmission and a conventional motor.

Figure 2 is a transverse vertical sectional view taken through Figure 1 approximately on the line 2—2.

Figure 3 is an enlarged longitudinal sectional elevational view of the left hand side of the mechanism with the casing removed.

Figure 4 is a fragmentary detail of a portion of the clutch rotor showing one of the ribs.

Figure 5 is a transverse vertical sectional view taken through Figure 3 approximately on the line 5—5.

Figure 6 is a longitudinal vertical sectional view taken through Figure 10 approximately on the line 6—6.

Figure 7 is a longitudinal vertical sectional view taken through Figure 2 approximately on the line 7—7.

Figure 8 is an elevational view of a portion of the disk compressing ring or annulus.

Figure 9 is a transverse sectional view taken through Figure 8 approximately on the line 9—9.

Figure 10 is a transverse vertical sectional view taken through Figure 7 approximately on the line 10—10 and looking in the direction of the arrow.

Figure 11 is a top plan view of the clutch release locking yoke.

Figure 12 is a detailed sectional view through Figure 3 approximately on the line 12—12.

Figure 13 is an elevational view of the speed affected nut.

Figure 14 is a sectional view showing the brake band retracting spring mechanism.

Figure 15 is a longitudinal sectional view taken through Figure 7 approximately on the line 15—15.

Figure 16 is a transverse sectional view taken through Figure 15 approximately on the line 16—16.

Figure 17 is a perspective view of one of the pins carried by the clutch plate compressing annulus.

Referring in detail to the drawings, the numeral 5 refers generally to a conventional automobile transmission, and the numeral 6 to the embodiment of the present invention which takes the place of the usual clutch and is located between the transmission and the motor. The clutch foot pedal is indicated at 7 while the foot brake pedal is indicated by the numeral 8. As seen in Figures 1 and 2 the clutch pedal 7 is mounted upon the clutch shaft 9, and pivotally connected to the brake pedal 8 as indicated at 10 is a plunger 11 which operates in a barrel 12 and is held yieldingly against withdrawal therefrom by means of a coiled spring 13. The barrel 12 has an ear 14 which is engaged by a pin 15 and through the connection of the pin with an arm 16 movement of the brake pedal is transmitted to a transverse shaft 17 the nature and purpose of which will be disclosed herein. Forwardly of and slightly below the transverse shaft 17 is another shaft 18 to which is fixedly connected an arm 19 which has pivotally connected to the outer end thereof one end of a link 20 having its opposite end pivoted to the link 22 at the point 21. The pivot 21 also connects the rear end of the link 22 and the front end of the link 23. The front end of the link 22 is pivotally connected to the outer end of an arm 24 which is fixed on the clutch shaft 9, while the rear end of the long straight link 23 is pivotally connected to the outer end of an arm 25 which is fixed to that portion of a shaft 26 which extends from the left hand side of the casing which encloses the clutch mechanism.

The casing which encloses the clutch mechanism comprises an upper half 27 and a lower half 28 bolted together by means of flanges and bolts indicated by the numerals 29 and 30, respectively. This is only a suggested type of casing, and any type or adaptation of casing which will permit the connection of the clutch and brake pedals and the free movement of the linkage in connection therewith, and afford adequate adaptation of the device of the invention to vehicles of different types and makes may be used. The rear end of the casing is to be bolted or otherwise suitably connected to the forward end of the transmission casing, and the front end of the casing is to be similarly attached to the motor or fly-wheel housing as indicated at 31 in Figure 1 and Figure 2. With this fully enclosed type of installation an oil lubricant may be used so that the parts all work in oil, thereby reducing wear and increasing efficiency and reducing transmission of vibration from the motor.

Suitably supported within the clutch housing is the clutch mechanism the nature of which is clearly shown in Figures 3 and 7, to which reference is now made. The numeral 32 refers to the forward end of the transmission shaft which is shown in dotted lines upon which is outside splined the hub 33 of the clutch rotor casing generally designated 34 which has the rim 35 which supports the annulus of brake material or brake drum designated 36 which is acted upon by the surrounding brake contractible band 37. A suitable ball bearing structure 38 surrounds the hub 33 and acts between the clutch casing 34 and the housing 6. As indicated at 41 the clutch shaft 40 is outside splined to the clutch disk carrier rotor 42 which thereby is rotatable relative to the rotor casing 34. The carrier clutch disks 43 have the radially inwardly projecting tabs 44 placed in the slots 45 in the peripheral annulus portion 46 of the carrier 42. The clutch plates of larger diameter which are designated by the numerals 47 are stationary with respect to the clutch rotor casing 34 and the clutch disks 43 work therebetween. As shown in Figure 5, the clutch plates 47 have peripheral notches 47' which receive the lugs 35' distributed around the inward surface of the casing rim 35. In the embodiment shown herein I employ seven of the larger plates 47 and six of the smaller clutch plates 43, but a greater or less number of these plates may be employed as requirements dictate. Acting upon the forward side of the forward clutch plate 47 is a compressing annulus generally designated 48 which has bosses 49 in its front side which have fixed therein pins 50 which have a cylindrical body portion 51 and a rear reduced portion 52. These pins 50 slide through openings in the front wall plate 53 of the rotor casing which is secured in the manner shown in Figure 6 to the peripheral annulus 35 of the rotor casing 34. Bolts 54 extend through the marginal portions of the plate 53 which is in the form of spider or web as seen clearly in Figure 10.

At diametrically opposite points on the forward side of the plate 53 are pairs of ears 55 which mount pivot pins 56 which pivotally connect the radially outward end of arms 57 which are connected at their radially inward ends between ears on the rear side of an annulus 58 which has a bevelled front face and surrounds a slidable worm 59 on which works a left hand threaded heavy nut 60, which nut 60 is the speed affected inertia element of my clutch mechanism. Although it is not stated at this point just what actuates the arms 57, it is desired to point out that rearward movement of the arms 57 causes the pins 50 to move rearwardly and carry the compressing annulus 48 into contact with the forward one of the clutch rings or plates 47 so that the clutch plates 43 are gripped between the plates 47 and direct drive established through the clutch mechanism.

It will be seen that the worm 59 comprises a sleeve which is outside splined as indicated at 61 and slidable upon the clutch shaft 40. The worm is provided at its rear end with a stop flange 62 and is threaded at its forward end as indicated at 63 to receive a lock nut 64 which permits the removal of the inertia element 60. The nut 60 being left hand threaded moves forwardly when the speed of the transmission shaft 32 is greater than that of the clutch shaft 40 and rearwardly when the speed of the clutch shaft is greater than that of the transmission shaft 32. Lugs 58' on the forward face of the annulus 58 are engaged by and received in recesses 60' in the rearward face of the nut 60 when the nut 60 has moved sufficiently far in a rearward direction, so as to prevent rotation of the nut 60 relative to the annulus 58.

The lugs 58' have tapered or bevelled sides acting as cam surfaces in conjunction with generally similar lug-forms 60'' on the rearward face of the nut 60 which result from the presence of the recesses 60'. The effect is to have both lugs and recesses on both the nut 60 and the annulus 58. The bevelled ends of the lugs engage in a cam action when the nut has been rotated sufficiently far in a rearward direction and thereby the compressing action of the annulus 48 on the clutch plates is usefully increased. Of course, movement of the nut 60 in the rearward direction mentioned is conditioned upon rotation of the clutch shaft 40 at a higher rate of speed than the transmission shaft 32, as when the engine to which the clutch shaft 40 is directly connected is pulling the car. When, however, the engine is not pulling the car, but is being turned over by the momentum of the forward motion of the car, the accelerator of the engine having been released, a powerful tendency exists for the inertia nut 60 to travel on the worm 59 in the opposite or forward direction and away from the annulus 58. This tendency is permitted to merge into action by a small amount of slippage between the clutch plates which occurs as the engine speed drops below that of the transmission shaft. This slippage of the clutch plates in a reverse direction is sufficient to enable the engaged bevelled cam surfaces of the various lugs on the nut 60 and annulus 58 to relieve their positions by moving slightly in the directions opposite to the directions in which their engagement was made. In this way the nut 60 becomes quickly free to be rotated on the worm and thereby moved in a forward direction responsive to the accelerated rotation of the clutch shaft 40, and in so doing release the annulus 58, the annulus 48, and the clutch plates into "free-wheeling" positions.

The threads on the worm 59 and in the nut 60 are so arranged that less force is required to "back-off" the nut 60 from clutch-engaging rearward position than is required to move the nut 60 into clutch-engaging position; so that combined with the cam action of the lugs described above, there is the "backing-off" tendency of the nut, to get the nut started quickly in the forward clutch disengaging position whenever the pull of the car engine is substantially diminished by letting up the accelerator pedal. It should here be stated that the clutch shaft 40 has mounted on the front end thereof the flanged hub 66 which is installed on the shaft 40 by first pushing the same on the shaft to a rearward position, then inserting the transverse key 65 in the shaft 40 and then bringing the hub 66 forwardly so that the extruding ends of the key 65 engage in accommodating openings in the bore of the hub, whereby the hub 66 is prevented from being moved farther forward or turned on the shaft 40. A longitudinal key 67 on the shaft 40 is also engaged with the bore of the hub. The flange of the hub 66 is to be bolted to either a similar flanged hub on the crankshaft of the motor or to the flywheel of the motor as may be desired.

Surrounding the hub 66 and the forward portion of the clutch shaft 40 is a heavy helical spring 68 which acts between the flange of the hub 66 and a slidable ring 70 which is freely slidable on the shaft 40. The helical spring 68 normally causes the slidable member 70 to abut the forward end of the worm 59, and push the worm 59 rearwardly in a manner to cause engagement of the clutch plates 47, 43, through the cooperation of the nut 60, the annulus 58, and the arms 57.

Rearward movement of the speed affected inertia element nut 60 will bring about an engagement thereof with the annulus 58 which, in turn, causes the rearward swinging of the arms 57 whereby the pins 50 are pushed rearwardly through the plate 53 and bring the compressing annulus 48 into forcible engagement with the forward clutch plate 47 for compressing the clutch plates 47, 43 together and increasing the clutch griping action. This rearward movement of the nut 60 takes place when the speed of the clutch shaft 40 is greater than that of the transmission shaft 32. However, when the speed of the transmission shaft 32 is greater than that of the clutch shaft 40 the speed affected nut 60 will move forwardly and thereby release itself from engagement with the annulus 58, with an obvious consequent releasing of the gripping relation of the clutch plates, until a position of the clutch plates is reached in which there is absolutely no effective engagement between the clutch plates 47 and the clutch plates 43, in which condition a status of "free-wheeling" obtains.

When the clutch plates 43, 47 are engaged and it is desired to prevent disengagement thereof, the clutch release locking yoke 72 is brought into action to keep the clutch release yoke in the engaged position so that the transmission will not go into "free-wheeling" but maintains direct drive between the engine and the drive shaft so that the engine may be used as a brake to reduce the car speed.

The yoke 72 is a horseshoe-shaped member as shown in Figures 2, 10 and 11 of the drawings. Its horns which are adapted to be positioned between the annulus 58 and the ring 60 have thereon friction reducing balls 79 on the opposite sides thereof against which the nut 58 and ring 60 ride. A vertical rod 73 is attached to the top of the yoke 72 and extends through the clutch housing for manual manipulation. A tensioned spring 74 is arranged above the housing to retract the yoke out of operative position and into inoperative position as soon as the yoke is released from operative position by mechanism to be described herein.

When the yoke 72 is operated into operation it takes up a position immediately forward of and engaging the front side of the annulus 58 and holds the annulus 58 from moving forwardly. With the yoke 72 so positioned and the annulus 58 so held the fact that the relative rates of rotation of the clutch and transmission shafts may be different will not let the transmission go into "free-wheeling", which it would otherwise do.

A clutch releasing yoke 75 works in the channel of the shiftable ring 70 and the yoke has pivoted thereto arms 76 which are rigidly mounted upon the transverse shaft 18. The clutch release lock yoke 72 is operated by means of the shaft 17 which has rigidly connected arms 77 pivotally connected to stub shafts 78, formed on the yoke 72. As seen in Figure 3 and in Figure 12 the lower end portions of the arms of the yoke 72 are provided on either side with ball bearings 79 which provide practically frictionless engagement of the yoke 72 with the beveled face 80 on the rear side of the nut 60 and the beveled face 81 on the front side of the annulus 58.

The brake band 37 which encircles the casing 34 has on one end the strap 94 and on the opposite end the adjustable anchor 95 which is connected to the left side of the lower half of the clutch housing 6 in the manner shown at 96 in Figure 2. Pivotally and operatively connected as indicated at 94' to the strap 94 is the outer end of an arm 93 fixed on the brake operating shaft 26. At the right side of the upper half of the housing 6 is a rod 98 secured as shown in detail in Figure 14 to the brake band 37. A spring 99 operates between a washer 100 which is secured by a pin 101 on the rod 98 and a plate and washer 102, engaged with the outside of the housing 6, so that the rod 98 is moved to draw the brake band 37 away from the brake material 36 when the brake band is released.

With the vehicle at a standstill, with the transmission in neutral and the clutch pedal 7 in engaged position, and the motor of the vehicle running, a condition obtains in which the transmission shaft 32 and the clutch shaft 40 are turning at the same rate of speed. In order to shift into gear from neutral, it is necessary to first depress the usual clutch pedal 7. This disengages or releases the clutch and at the same time contracts the brake band on the housing 34 so that the housing 34 and consequently the clutch plates 47, the transmission shaft 32, and the countershaft gears in the transmission are prevented from turning or continuing to turn while the clutch is disengaged and the transmission is being shifted into gear. While the vehicle transmission is in gear this braking arrangement has the effect of a drive shaft brake acting while the clutch is disengaged and operated by the clutch pedal. After the shift into gear has been made in the usual way the clutch pedal is then released to engage the clutch. The motor, which has been speeded up during these operations will turn the clutch shaft 40 which is directly connected thereto at a rate faster than that of the clutch casing 34 which is splined on the transmission shaft 32, and is at that time either turning slowly or is entirely stationary. This faster rotation of the clutch shaft 40 produces an increase in the force of engagement of the clutch plates 47 with the clutch plates 43, because the static inertia of the element 60 is such that it resists being turned on the worm 59 as the worm is rotated with the shaft 40 on which it is splined and instead moves along the worm in a rearward direction until it engages the forward face of the annulus 58 and pushes the annulus 58 rearwardly sufficiently to forcibly engage the clutch plates 47 through the medium of the arms 57, the pins 50, and the annulus 48. If for any reason the motor be slowed down by letting up on the accelerator subsequent to the described engagement of the clutch plates, to a speed less than that of the transmission shaft 32, the inertia of the nut 60, the described camming effect of the lugs on the nut 60 and on the annulus 58, and the pitch of the threads of the worm, in conjunction with the slight slip of the clutch plates in the reverse direction, cooperate to cause the nut 60 to move forwardly and away from the rearward clutch plate-engaging position and thereby release the engagement of the clutch plates 47 and 43, by loosening the engagement of the compressor annulus 48 with the plates 47. The vehicle will then be in free wheeling, and shifting of the transmission into different forward speeds may then be accomplished without operating the clutch pedal during such times as the speed of the transmission shaft is greater than that of the clutch shaft 40.

In slowing down the vehicle while my clutch mechanism is in the above described free-wheeling condition, the foot brake pedal 8 is depressed in the usual way to apply braking force to the wheels of the vehicle. The first part of the brake applying movement of the pedal 8 turns the shaft 17 so as to operate the locking yoke 72 into a position in front of the annulus 58 which will prevent the annulus 58 from moving forwardly and thereby releasing the clutch plates which the annulus 58 would otherwise do as the motor speed falls below that of the transmission shaft as soon as the operator's foot is removed from the motor accelerator and applied to the brake pedal 8; whereby the clutch is maintained engaged and is prevented from disengaging automatically as it would otherwise do; and the braking power of the motor is rendered available for reducing the ground speed of the vehicle. This arrangement permits of locking the clutch out of automatic condition without applying the brake pedal. The spring in the member 12 equalizes the difference in the travel of the brake pedal and the travel of the yoke up and down. Of course, when the brake pedal 8 is subsequently released the locking yoke 72 is restored to initial inoperative position. The rod 73 which extends from the clutch housing 6 is connected to the locking yoke 72 in such a way that depressing the rod 73 will move the locking yoke into the locking position in front of the annulus 58, entirely independently of application of the brake pedal 8. The spring arrangement in the member 12 permits sufficient rotation of the shaft 17 for this purpose without disturbing the normal inoperative position of the brake pedal 8.

To bring the vehicle to a complete stop, the clutch pedal is depressed in the usual way to disengage the clutch, the brake pedal 8 being depressed simultaneously if desired. Regardless of the position of the locking yoke 72, the depressing of the clutch pedal will disengage the clutch, since compressing the clutch spring 68 by means of the clutch pedal 7 releases all other members of the clutch assembly.

When the clutch operating pedal 7 is depressed, two things happen practically in order, namely, the clutch operating spring 68 is compressed and the clutch released, and toward the end of the pedal movement, the clutch brake band 37 is contracted or applied. The first effect is produced by the rotation of the shaft 18, while the second mentioned effect is produced by the rotation of the shaft 26, both of which shafts are operatively connected to the clutch shaft 9 in the manner already described herein. It should be observed that the operation of the brake pedal 8 has nothing to do with the operation of the clutch, the only function of the brake pedal in the circumstances described being to apply and release the locking yoke by operating the shaft 17.

When the clutch pedal is depressed this compresses the clutch spring 68 so as to permit forward movement of the worm 59 on the shaft 40. This forward movement of the worm 59 carries the nut 60 forwardly and away from the annulus 58 so that the annulus 58 is freed to move forwardly and, of course, permit the locking yoke 72 to swing forwardly also. Enough space is provided between the described elements to permit free action thereof independently of each other and give the clutch plates room enough to completely disengage. When the clutch spring is compressed the described members operate automatically for releasing the clutch plates. When the members are locked in the free-wheeling positions, the clutch may be operated with the clutch pedal 7 as in the case of any ordinary clutch. The only means provided for releasing the locking yoke 72 is the brake pedal 8.

In a practical embodiment of the present invention the yoke 72 is approximately one-quarter of an inch in thickness and the nut or annulus 60 travels about one-quarter of an inch along the worm 59.

From the foregoing it will be evident that when the clutch pedal is operated in the release direction and the brake is operated to apply the brakes, the yoke 72 forces the annulus 58 forwardly so that the clutch plates are compressed. If the clutch is engaged when the brake is applied, the yoke does not turn the nut or annulus 60, but simply compresses the spring 68, the nut 60 and the worm 59 moving forwardly on the shaft 40.

As the foot brake pedal 8 is pushed downwardly, this pulls forward the link 11 which is fastened to the pedal 8 and this action turns the shaft 17 so as to force the yoke 72 downwardly so as to prevent the then engaged clutch plates from releasing until the clutch pedal is forced downwardly while the foot brake pedal is released. The connection between the brake pedal 8 and the arm 16 is utilized in the manner and form shown in Figure 15 and this arrangement is provided to permit the brake pedal to be forced down as far as necessary, without forcing the yoke 72 too far down.

As the clutch pedal 7 is forced downwardly into the releasing position, this forces the arm 24 forwardly and the connecting link 23 pulls the arm 25 forwardly and thereby turns the shaft 26, whereby the other end of the arm 93 is forced downwardly. Since the arm 93 is fastened to the bracket 94, the downward movement of this arm contracts the brake band 37, which operates on the case 35, to constitute the clutch brake.

To release the clutch, the clutch pedal 7 is pushed downwardly and this forces the arm 24 forwardly. The linkage connecting the arms 24 and 19 then turns the shaft 18 and this forces the yoke 72 forwardly and compresses the clutch spring 68. This permits the clutch plates 47 and 43 to separate and thereby break the direct drive connection between the engine and the transmission shafts.

In connection with the statement of operation appearing herein above it is to be noted that when the clutch pedal is depressed, this compresses the clutch spring 68 and this permits the worm 59 to move forwardly on the shaft 49. The effect of this movement of the worm 59 is to release the pressure between the nut 60 and the annulus 58. The release of the pressure on the forward side of the annulus 58 which was constituted by the active pressure of the clutch springs maintained in the clutch plates, forces the annulus 58 forwardly. Further, when the locking yoke 72 is in the operative position the lower portions or horns thereof swing forwardly and the clutch spring contracts about three quarters of an inch. The locking means is about a quarter of an inch thick, and this difference in thickness permits the moving parts to work freely and gives the clutch plates plenty of room in which to disengage. When the clutch spring is compressed, the nut 60, the annulus 58, the worm 59, and the clutch plates and the clutch spring 68 work automatically to release the clutch. The clutch pedal will, if operated, release the clutch whether or not the locking means described is in the operative position or not. Since the clutch spring 68 can be contracted about three quarters of an inch in a full-sized model, and since the yoke 72 only takes up about one-quarter of an inch, sufficient room is provided to permit the clutch pedal to release the clutch.

Though I have shown and described the preferred embodiment of the invention, it is to be definitely understood that I do not desire to limit the application of the invention thereto, and any change or changes may be made in material and structure and arrangement of parts, within the spirit of the invention and the scope of the subjoined claims.

What is claimed is:—

1. An automatic free-wheeling clutch of the type described for connection between the forward end of the transmission of an automobile transmission shaft and the rearward end of the motor shaft of the motor of the automobile, said clutch comprising a rotor casing splined on the transmission shaft, clutch plate means anchored in the rotor casing and slidable axially thereon, a clutch rotor, a clutch shaft on which said rotor is splined, axially slidable clutch plate means carried by the rotor and arranged to engage the clutch plate means of the rotor casing, clutch plate compressing means carried by the rotor casing, inertia operated longitudinally movable means splined on the clutch shaft and operatively connected to said clutch plate compressing means for compressing and releasing the same, clutch plate engaging spring means mounted upon and surrounding the clutch shaft and operatively connected with the clutch plate compressing means, and motor shaft connection means between the forward end of the clutch shaft and the rear end of the motor shaft, and manual means for contracting and releasing the clutch plate engaging spring means.

2. An automatic free-wheeling clutch of the type described for connection between the forward end of the transmission of an automobile transmission shaft and the rearward end of the motor shaft of the motor of the automobile, said clutch comprising a rotor casing splined on the transmission shaft, clutch plate means anchored in the rotor casing and slidable axially thereon, a clutch rotor, a clutch shaft on which said rotor is splined, axially slidable clutch plate means carried by the rotor and arranged to engage the clutch plate means of the rotor casing, clutch plate compressing means carried by the rotor casing, inertia operated longitudinally movable means carried by and surrounding the clutch shaft and operatively connected to said clutch plate compressing means, clutch plate operating spring means mounted upon and surrounding the clutch shaft and operatively connected with the clutch plate operating means, motor shaft connection means between the forward end of the clutch shaft and the rear end of the motor shaft, manual means for releasing and engaging the clutch plate operating spring means, and manually operable means for locking said speed affected means out of operation and for locking the clutch plate compressing means in compressing position.

3. An automatic free-wheeling clutch of the type described for connection between the forward end of the transmission of an automobile transmission shaft and the rearward end of the motor shaft of the motor of the automobile, said clutch comprising a rotor casing splined on said transmission shaft, clutch plate means anchored in said rotor casing and slidable axially thereon, a clutch rotor, a clutch shaft on which said rotor is splined, axially slidable clutch plate means carried by said rotor and arranged to engage the clutch plate means of the rotor casing, clutch plate compressing means carried by said rotor casing, inertia operated longitudinally movable means carried by and surrounding said clutch shaft and operatively connected to said clutch plate compressing means, clutch plate operating spring means mounted upon and surrounding said clutch shaft and operatively connected with said clutch plate compressing means, motor shaft connection means between the forward end of the clutch shaft and the rear end of the motor shaft, manual clutch operating means for compressing the clutch plate operating spring means, manually operable means for positively locking said speed affected means out of operation, said manually operable means acting also for locking the clutch plate compressing means in compressing position.

4. An automatic free-wheeling clutch of the type described for connection between the forward end of the transmission of an automobile transmission shaft and the rearward end of the motor shaft of the motor of the automobile, said clutch comprising a rotor casing splined on said transmission shaft, clutch plate means anchored in said rotor casing and slidable axially thereon, a clutch rotor, a clutch shaft on which said rotor is splined, axially slidable clutch plate means carried by said rotor and arranged to engage the clutch plate means of the rotor casing, clutch plate compressing means carried by said rotor casing, inertia operated longitudinally movable means carried by and surrounding said clutch shaft and arranged to operatively connect with said clutch plate compressing means, clutch plate operating spring means mounted upon and surrounding said clutch shaft and operatively connected with said plate compressing means, motor shaft connection means between the forward end of the clutch shaft and the rear end of the motor shaft, manual clutch operating means for compressing said clutch plate operating spring means.

5. An automatic free-wheeling clutch of the type described for connection between the forward end of the transmission of an automobile transmission shaft and the rearward end of the motor shaft of the motor of the automobile, said clutch comprising a rotor casing splined on the transmission shaft, clutch plate means anchored in the rotor casing and slidable axially thereon, a clutch rotor, a clutch shaft on which said rotor is splined, axially slidable clutch plate means carried by the rotor and interposed between the clutch plate means of the rotor casing, clutch plate compressing means carried by the rotor casing, inertia operated longitudinally movable means carried by and surrounding the clutch shaft and operatively connected to said clutch plate compressing means, clutch engaging spring means mounted upon and surrounding the clutch shaft and operatively connected with the clutch plate compressing means, motor shaft connection means between the forward end of the clutch shaft and the rear end of the motor shaft, manual clutch operating means for contracting and releasing the clutch engaging spring means, manually operable means for locking said speed affected means out of operation and for locking the clutch plate compressing means while in compressing position for holding the transmission shaft and the clutch shaft directly connected, means operable by the manual clutch operating means for placing and releasing said clutch plate compressing means in and from compressing position, brake means operating upon said clutch rotor casing, linkage means connected between the manual clutch pedal operating means, and the brake means for operating the brake means.

6. In a motor vehicle having a motor shaft and a transmission shaft, a clutch body fixed on the transmission shaft and embodying clutch plate means, a clutch shaft fixed to the motor shaft and embodying a clutch rotor carrying second clutch plate means in position to engage the first clutch plate means for operatively connecting the clutch shaft and transmission shaft, spring means carried by the clutch shaft and normally effecting engagement of the second and first clutch plate means, brake means engageable with the clutch body, manual means for contracting the said operating spring means to release the first and second clutch plate means, and connection means between the manual means and the brake means for applying the brake means to the clutch body as the first and second clutch plate means are disengaged.

7. In a motor vehicle having a motor shaft and a transmission shaft, a clutch body fixed on the transmission shaft and embodying clutch plate means, a clutch shaft fixed to the motor shaft and embodying a clutch rotor carrying second clutch plate means in position to engage the first clutch plate means for operatively connecting the clutch shaft and transmission shaft, second clutch plate means, operating spring means carried by the clutch shaft and normally effecting engagement of the second and first clutch plate means, brake means engageable with the clutch body, manual means for contracting the said operating spring means to release the first and second clutch plate means, and connection means between the manual means and the brake means for applying the brake means to the clutch body as the first and second clutch plate means are disengaged, and inertia operated means on the clutch shaft, operating connection means between the inertia operated means and the second clutch plate means for releasing and engaging the same independently of the manual means.

8. In a motor vehicle having a motor shaft and a transmission shaft, a clutch body fixed on the transmission shaft and embodying clutch plate means, a clutch shaft fixed to the motor shaft and embodying a clutch rotor carrying second clutch plate means in position to engage the first clutch plate means for operatively connecting the clutch shaft and transmission shaft, second clutch plate means, operating spring means carried by the clutch shaft and normally effecting engagement of the second and first clutch plate means, brake means engageable with the clutch body, manual means for contracting the said operating spring means to release the first and second clutch plate means, and connection means between the manual means and the brake means for applying the brake to the clutch body as the first and second clutch plate means are disengaged, and inertia operated means having a portion surrounding and splined to the clutch shaft and slidable thereon, and another portion surrounding the first portion and movable longitudinally thereon, said operating connection means being connected to the other portion of said inertia operated means.

ERNEST H. EASTMAN.